United States Patent
Allen et al.

(10) Patent No.: US 10,972,280 B2
(45) Date of Patent: Apr. 6, 2021

(54) BLOCKCHAIN FOR DISTRIBUTED AUTHENTICATION OF HARDWARE OPERATING PROFILE

(71) Applicant: Applied Materials, Inc., Santa Clara, CA (US)

(72) Inventors: Adolph Miller Allen, Oakland, CA (US); Paul Kiely, Santa Cruz, CA (US); Noufal Kappachali, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 117 days.

(21) Appl. No.: 16/155,318

(22) Filed: Oct. 9, 2018

(65) Prior Publication Data

US 2020/0112438 A1 Apr. 9, 2020

(51) Int. Cl.
*H04L 9/32* (2006.01)

(52) U.S. Cl.
CPC .......... *H04L 9/3236* (2013.01); *H04L 9/3297* (2013.01); *H04L 2209/38* (2013.01)

(58) Field of Classification Search
CPC .. H04L 9/3236; H04L 9/3297; H04L 2209/38
See application file for complete search history.

(56) References Cited

U.S. PATENT DOCUMENTS

| | | | |
|---|---|---|---|
| 8,055,886 B2 * | 11/2011 | Tashiro | G06F 9/3016 712/241 |
| 10,348,488 B1 * | 7/2019 | Paczkowski | H04L 45/56 |
| 2018/0001184 A1 * | 1/2018 | Tran | A63B 43/004 |
| 2020/0005559 A1 * | 1/2020 | Grunbok, II | H04L 9/0637 |

OTHER PUBLICATIONS

Rosic, "What is blockchain Technology? A Step-by-Step Guide for Beginners," retrieved from the Internet Sep. 4, 2019, retrieved from: http://blockgeeks.com/guides/what-is-blockchain-technology, 20 pages.
"What is blockchain?" IBM, 2018, retrieved from the Internet Sep. 4, 2019, retrieved from: 2. https://public.dhe.ibm.com/common/ssi/ecm/xi/en/xi912346usen/blockchain-101_XI912346USEN.pdf.

* cited by examiner

*Primary Examiner* — Mohammad A Siddiqi
(74) *Attorney, Agent, or Firm* — Lowenstein Sandler LLP

(57) ABSTRACT

Profile_ID files, containing proprietary hardware operating details of an originating user who originates a process recipe, are encrypted before dissemination of the process recipe to an end user. Blockchain technology is used to enable the end user to validate the encrypted process recipe and control uniform validated process across multiple chambers and locations.

20 Claims, 6 Drawing Sheets

BLOCKCHAIN FOR DISTRIBUTED AUTHENTICATION OF HARDWARE OPERATING PROFILE

TECHNICAL FIELD

Embodiments of the disclosure relate generally to protecting sensitive information about hardware operating details for a particular recipe with distributed authentication of software control files.

BACKGROUND

Hardware operating details, such as set points for process control knobs in a semiconductor processing chamber, may be proprietary information that is needed to be concealed from an operator or end user. The operator/end user may merely have access to an encrypted file to be able to run a recipe to process a semiconductor wafer in the processing chamber, without knowing the exact set points, because the encrypted file automatically regulates the set points associated with the recipe.

However, in a distributed system of processing chambers, this lack of transparency can become a bottleneck or a cause of error, because an operator/end user of a particular processing chamber has no way of verifying whether s/he is using the most updated version of the recipe to be in sync with the recipe run by the other processing chambers, unless the recipe originator individually notifies each operator/end user every time the recipe is modified.

SUMMARY

Hardware profiles, containing proprietary details of hardware operational settings, are encrypted before dissemination of a process recipe to an end user. Blockchain technology is used to enable end users to validate the encrypted process recipe and to control a validated uniform process across multiple chambers and locations.

Specifically, an aspect of the disclosure is directed to methods and systems for managing changes in hardware operating profiles in a distributed network of chambers for semiconductor processing. The method starts with receiving an initial list of hardware operating profiles at a first node of the distributed network of chambers. Then, a first hash is cryptographically assigned to the initial list of hardware operating profiles to create a first encrypted block with a first time stamp. The first encrypted block is disseminated to a second node of the distributed network of chambers, enabling all chambers coupled to the second node to use the initial list of hardware operating profiles. A second list of hardware operating profiles is received at the first node of the distributed network of chambers. A second hash is cryptographically assigned to the second list of hardware operating profiles to create a second encrypted block with a second time stamp, the second hash being created by incorporating information from the first hash, and the second time stamp indicating that the second list has at least one hardware operating profile that has been updated since the first time stamp. The second encrypted block is then appended to the first encrypted block to create a chain of blocks. The chain of blocks is then disseminated to the second node of the distributed network of chambers, enabling all chambers coupled to the second node to use the at least one hardware profile that has been updated.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
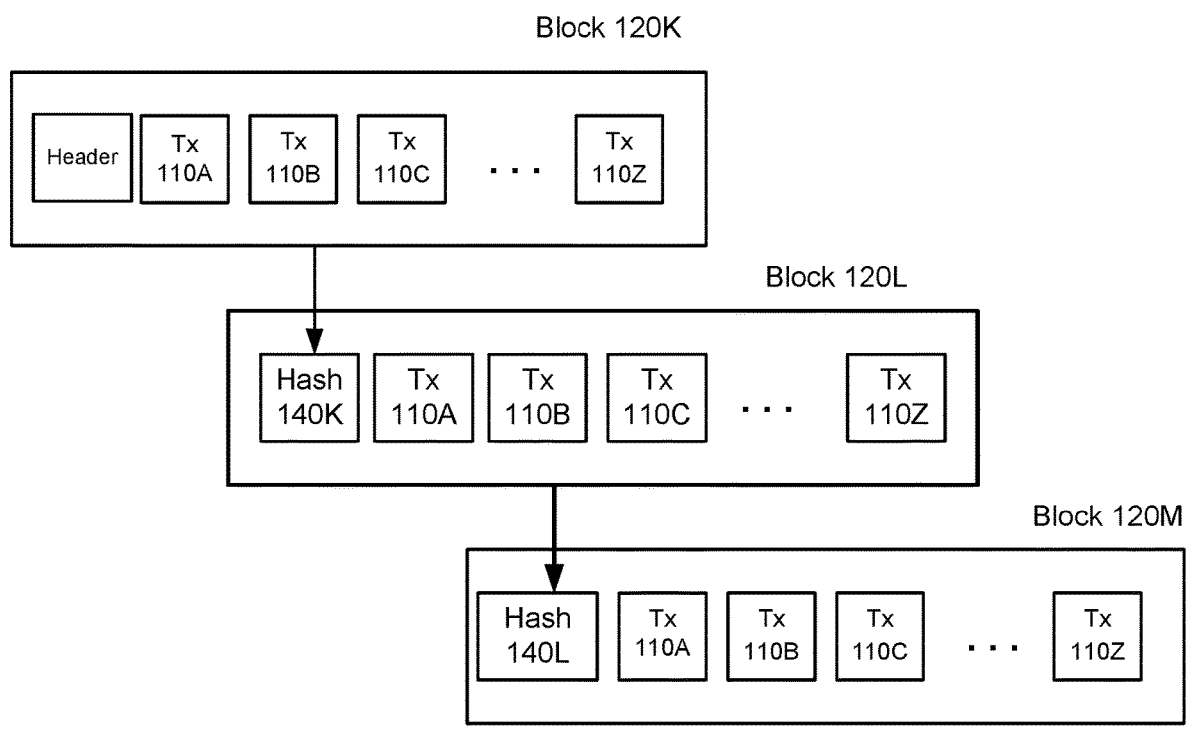
FIG. 1 illustrates operation of a cryptographically-protected distributed ledger, in accordance with one embodiment.

Aspects of the present disclosure are directed to distributed authentication of software control files for hardware component operating profiles. A profile identification (ID) list contains sensitive information about detailed process recipe and hardware component operating parameters. This disclosure implements a system for profile ID management in a trustworthy manner using blockchain technology.

Presently, the capability to define individual hardware component profile IDs and a profile ID list is solely controlled by a recipe originator. The profile ID comprises a text file that is editable offline or online using a graphic user interface (GUI) of software associated with a local server, such as Common Ground Architecture (CGA) software. The local server is included in a platform that may have one or more processing chambers. The CGA software allows the user, i.e. the recipe originator, to encrypt the profile ID file. The encrypted file is then downloaded and sent to the operational site of the end user, where it is uploaded to the end user's local server and interpreted by the CGA software (or its equivalent software) used by the end user's system.

This existing approach has several flaws related to file integrity and authentication of the profile ID. As described above, the originating user may update a process recipe on one chamber. He then must copy that recipe to another chamber and then maintain the recipe name across chambers. The entire process of verification relies on the originating user and a recipe comparison tool within the CGA software. However, if the originating user erroneously overwrites operating parameters, alters existing ID numbers, or deletes established profile IDs, that error may render an end user's desired recipe inoperable.

An additional problem is created when multiple chambers across multiple tools and fabrication facilities ("fabs," also referred to as "factories" elsewhere in the specification) are required to copy the exact functionality of the hardware component as described in the profile ID. The profile ID itself is a de facto hardware and process control modifier that must be regulated to ensure process transparency across chambers and manufacturing locations. For example, a chamber running a process recipe in California using a specific profile ID should use the same profile ID used by chambers across the globe, e.g., chambers in Singapore, Taiwan, and Japan. The existing solution requires that the originating user record the original profile ID list and record every modification, as well as disseminate the list (original or modified) to every manufacturing location. Currently there is no structured framework for this recording and no capability of independent authentication of the file at the end user sites.

Aspects of the present disclosure address the above and other deficiencies of over-reliance on the originating user by using a secure software technology to record and manage profile ID changes, thereby enabling protection of the recipe originator's proprietary rights in the information contained in the profile ID list without compromising the end user's trust.

A non-limiting example of a profile ID is a software profile that controls the set points for a pulsing DC power supply. An originating user defines several profile IDs by unique ID number, each number corresponding to the set points for the power supply. For example, profile ID#1 may correspond to 12 kW power, 6 kHz pulsing frequency, 20% duty cycle, +50V reversal voltage. Profile ID#2 may correspond to 15 kW power, 10 kHz pulsing frequency, 22% duty cycle, +100V reversal voltage. A profile ID list contains several of these profile IDs.

Though in the above description, Profile ID of the power supply of a pulsing generator is mentioned, persons skilled in the art would readily appreciate that the concept of Profile ID can be expanded to other software related control lists that require multi-chamber (and may be multi-site) updates. For example, the list may include, but is not limited to, gas panel configuration files, chamber configuration files for multiple chamber settings (e.g., power supply ramping rates and delays), or mass flow controller (MFC) configuration files.

In one embodiment, profile ID changes may be recorded using a distributed ledger. The distributed ledger may be implemented by an immutable append-only database, in which the transaction records are replicated by a plurality of distributed ledger nodes interconnected by various combinations of private and public networks. The distributed ledger may be cryptographically-protected, e.g., by cryptographically encrypting the transaction records, such that reversing a transaction becomes computationally infeasible. In one embodiment, the cryptographically-protected distributed ledger may be implemented by a blockchain (a "block" being a container data structure, having a header and a plurality of transaction records), as described in more detail herein below.

FIG. 1 schematically illustrates operation of a cryptographically-protected distributed ledger, in accordance with one embodiment. In one embodiment, new transaction records may be broadcasted and may be received by all currently active distributed ledger nodes. Each transaction record may be digitally signed by the initiator and may identify the parties by their respective blockchain addresses.

As schematically illustrated by FIG. 1, each node receiving the broadcasted transaction records may assemble several transaction records 110A-110Z into a block 120K, and may perform one or more cryptographic operations on the block to produce a cryptographically-protected block 120L comprising transactions 110A-110Z that are authenticated (i.e. digitally signed). In one embodiment, cryptographically protecting a block may involve incorporating a cryptographic hash 140K in the block header. The block hash is a unique identifier. No two blocks will have the same hash. A cryptographic hash may be represented by an irreversible function mapping a first bit sequence of arbitrary size to a second bit sequence of a pre-determined size, such that two different bit sequences are unlikely to produce the same hash value. The computations performed in order to cryptographically protect a block may be referred to as "proof-of-work."

Upon producing a cryptographically-protected block 120L, the node may broadcast the cryptographically-protected block 120L to the peer nodes. A node receiving the cryptographically-protected block 120L may accept the block and incorporate the hash 140L of the accepted block into the next block 120M. In general, every block in a blockchain network uses the previous block's hash to construct its own hash.

Thus, the distributed ledger produces an immutable chain of cryptographically-protected transaction records. Any modification (other than adding transactions) of the chain is computationally infeasible as such a modification would require repeating all the proof-of-work calculations. Peer nodes can leave and join the distributed ledger at any time, accepting the longest chain as the ledger record reflecting the transactions that have been performed before a given node has joined the network.

Though blockchain has been widely used for bitcoin and other crypto-currencies, this disclosure recognizes use of blockchain in managing proprietary information in distributed semiconductor processing systems. As an illustrative example, an initial profile ID list, Profile_ID List_0, may act as the first block in the chain, and the local server of the chamber that is used to create Profile_ID_List_0 is the primary node within the blockchain network. This chamber may be at the location where the originating user is located. Subsequent updates are added to the chain as Profile_ID_1 through Profile_ID_i where the index, i, can run from 1 to N. As each block is added to the chain, the new chain is communicated to the other nodes within the blockchain network for validation.

In one implementation, a closed, but expandable, network of blockchain nodes may comprise local chamber servers that control a power supply. A non-limiting illustrative example of a power supply is a high power pulse plasma generator (such as High Power Impulse Magnetron Sputtering generator, abbreviated as "HiPIMS" generator). This network may be further restricted within the subset of chambers developed by the recipe originator for a specific end user. As new chambers are added to the network of nodes, information about the new chambers may also be incorporated in new blocks. Profile_ID files are typically encrypted before dissemination to the end user. Also, by way of further protection of proprietary recipe, the entire blockchain registry may also be encrypted.

This instance of Profile ID list control is one example of the use of blockchain to update and validate a distributed registry to align new software controls across multiple systems of chambers at a same operating site or at different operating sites. One major benefit of this implementation is that it removes the time consuming and potentially error prone requirement of user governance and monitoring of the Profile ID lists across multiple operating sites.

Figure 2:
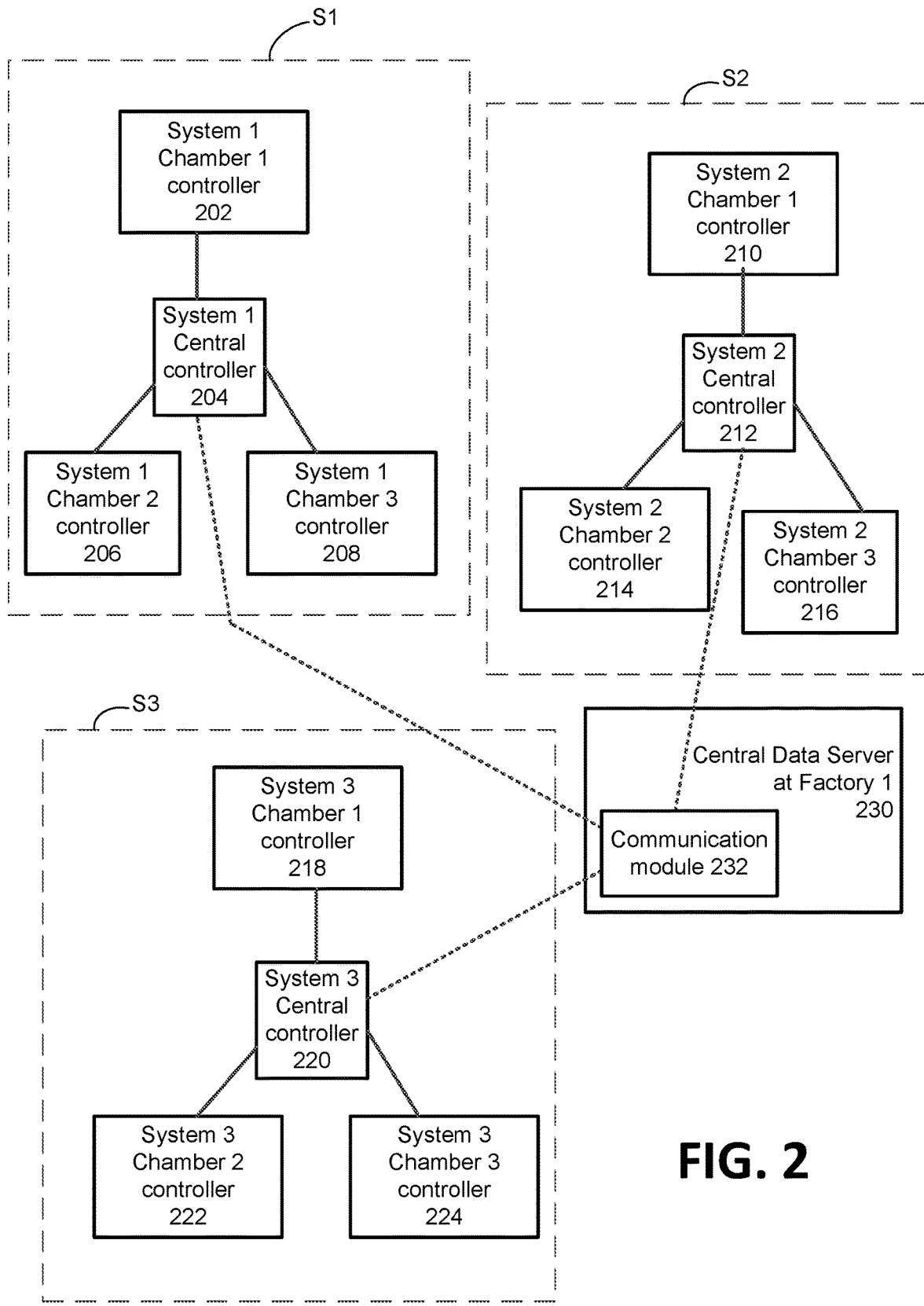
FIG. 2 is a schematic diagram showing embedding blockchain solution for managing profile IDs of hardware components (e.g., a power supplies) for multiple chambers across multiple systems, in accordance with some embodiments of the present disclosure.

FIG. 2 shows a blockchain network comprising three systems S1, S2 and S3 at Factory 1, a first operating site.

Each system may have one or more tools. Factory 1 has a central data server 230, which is communicatively coupled to the respective central controllers of S1, S2 and S3 via communication module 232. Each of systems S1, S2 and S3 comprises one or more chambers. Though three chambers are shown for each of S1, S2 and S3 in FIG. 2, the number of chambers in each system may vary. Local chamber controllers 202, 206 and 208 of S1 are coupled to central controller 204, which in turn is coupled with server 230. Similarly, local chamber controllers 210, 214 and 216 of S2 are coupled to central controller 212, which in turn is coupled with server 230, and, local chamber controllers 218, 222 and 224 of S3 are coupled to central controller 220, which in turn is coupled with server 230. An originating user may use GUI of any of the local chamber controllers, system central controllers or the central data server 230 to create the Profile ID list, and disseminate it through the blockchain network shown in FIG. 2. As long as the Profile ID is verified to be originated within a node of the blockchain network, other chambers operated by an end user can trust that profile ID to be sufficiently authentic to run a process.

The local chamber controllers (e.g., 202, 206, 208 and their central controller 204) may create a chamber local area network (LAN), running a first layer of blockchain network. The central controllers 204, 212 and 220 communicating with the central data server 230 may create a second layer of blockchain network between the tools, e.g. between the systems S1, S2, and S3. This second layer can be applied to periodically record chamber to chamber and/or tool to tool comparison. Server 230 may be a field share server (FSS).

Figure 3:
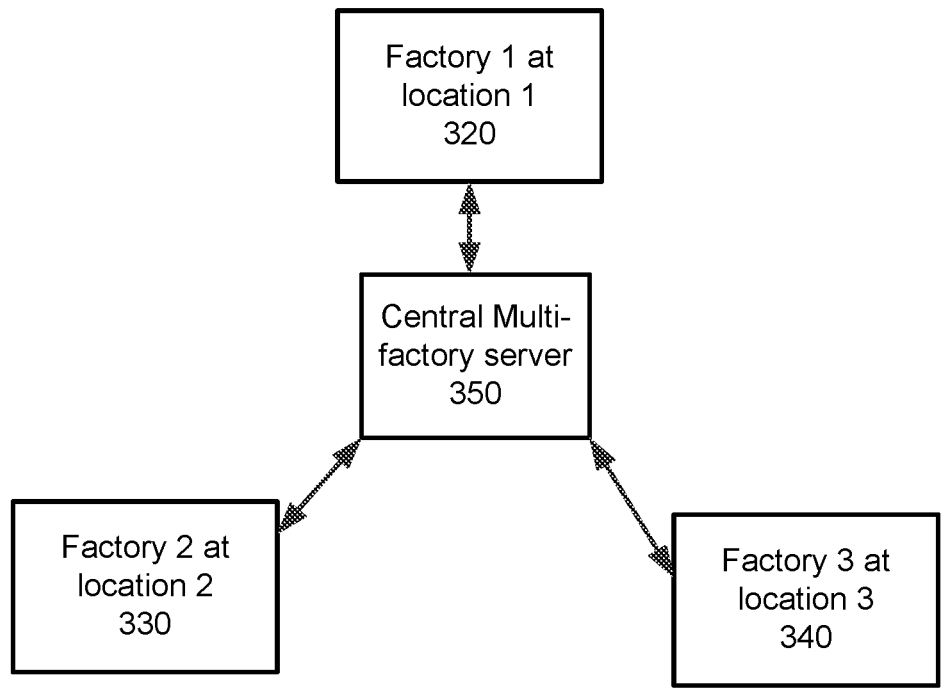
FIG. 3 illustrates extending the concept of distributed profile ID management over multiple factories and locations which can communicate to a central common node, in accordance with some embodiments of the present disclosure.

FIG. 3 shows that the concept of distributed profile ID management shown in FIG. 2 can be extended over multiple factories and locations which can communicate to a central common node of the blockchain network through a third blockchain layer. As an illustrative example, central multi-factory server 350 may be communicatively coupled to factory 1 at location 1 (shown as 320), factory 2 at location 2 (shown as 330), and, factory 3 at location 3 (shown as 340). Persons skilled in the art will appreciate that each server 350 may communicate with fewer or more than three factories, and/or each location can have more than one factories. In one example, systems S1, S2 and S3 shown in FIG. 2 may indicate a cluster of systems at the same factory, or at different factories. The scope of the disclosure is not limited by whether the fabs/factories are at the same or different geographic locations.

Though in the above description, Profile ID of the power supply of a pulsing generator is mentioned as an illustrative example, persons skilled in the art would readily appreciate that the concept of Profile ID can be expanded to other software related control lists that require multi-chamber (and may be multi-site) updates. For example, the list may include, but is not limited to, gas panel configuration files, chamber configuration files for multiple chamber settings (e.g., power supply ramping rates and delays), or mass flow controller (MFC) configuration files. Each chamber controller, such as controllers 202, 206, 208, 210, 214, 216, 218, 222, and 224, regulates one or more of the power supply, mass flow controller, types of precursor gases etc., all of which are important parts of a process recipe.

As described above, currently, an originating user may update a process recipe on one chamber and then must copy that recipe to another chamber and then maintain the recipe name across chambers. Verification of process recipe locally at an end user's site relies on the authenticity of the originating user. Optionally, the end user uses a recipe comparison tool available within a process control software, such as a CGA software. Using a blockchain distributed ledger system in a closed network of nodes, an update to a process recipe could be incorporated into a block and then added to the ledger and validated throughout the other nodes. This would embed the verification and dissemination of the recipe command definition across multiple chambers and locations within the blockchain. On the end user side, blockchain could be used for process recipe validation by validating Profile ID without the originating user having to disclose the recipe details to the end user. The end user can thus control process integrity across multiple chambers and locations.

The blockchain network of nodes may be defined by the originating user and/or the end user. The originating user may be a recipe supplier, while the end user may be a customer who uses the recipe at multiple chambers at their site. The supplier may also have their own network of chambers when developing or testing the recipe before handing it over to the customer.

Figure 4:
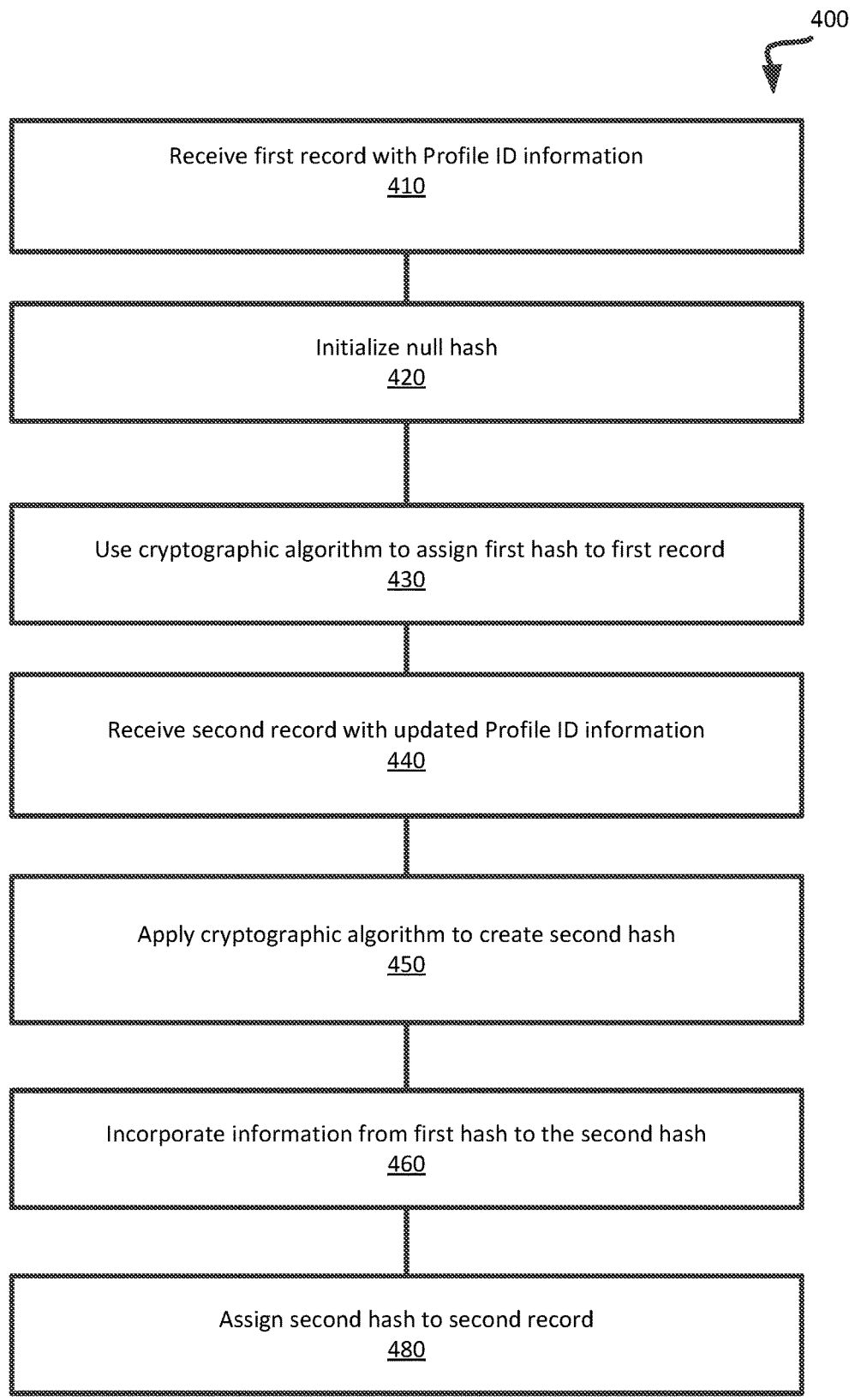
FIG. 4 is a flow diagram of an example method to using blockchain solution for managing profile IDs of hardware components, in accordance with some embodiments of the present disclosure.

FIG. 4 is a flow diagram of an example method 400 to enable profile ID management using blockchain. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At stage 410, a processor at a controller that is a part of a blockchain network receives a first record created by an originating user with desired Profile ID information. The originating user may use a process control software, such as CGA software, to select a record structure.

At stage 420, the processor initializes a first hash, which is a null ("0") hash. This is an identifier hash which may be incorporated in the header of a yet unencrypted block, such as block 120K in FIG. 1.

At stage 430, cryptographic algorithm is applied to assign a first hash to the first record. A first time stamp is created at this stage for the first record. This is shown in FIG. 1 as encrypted block 120L with hash 140K.

At stage 440, the processor receives a second record created by an originating user when he modifies the profile ID information in any way, i.e. profile ID list is updated. At stage 450, cryptographic algorithm is applied again to create a second hash. At stage 460, information from the first hash is incorporated into the second hash. A second time stamp is created at this stage. At stage 480, the second hash is assigned to the second record with the second time stamp. This is shown in FIG. 1 as encrypted block 120M with hash 140L.

Figure 5:
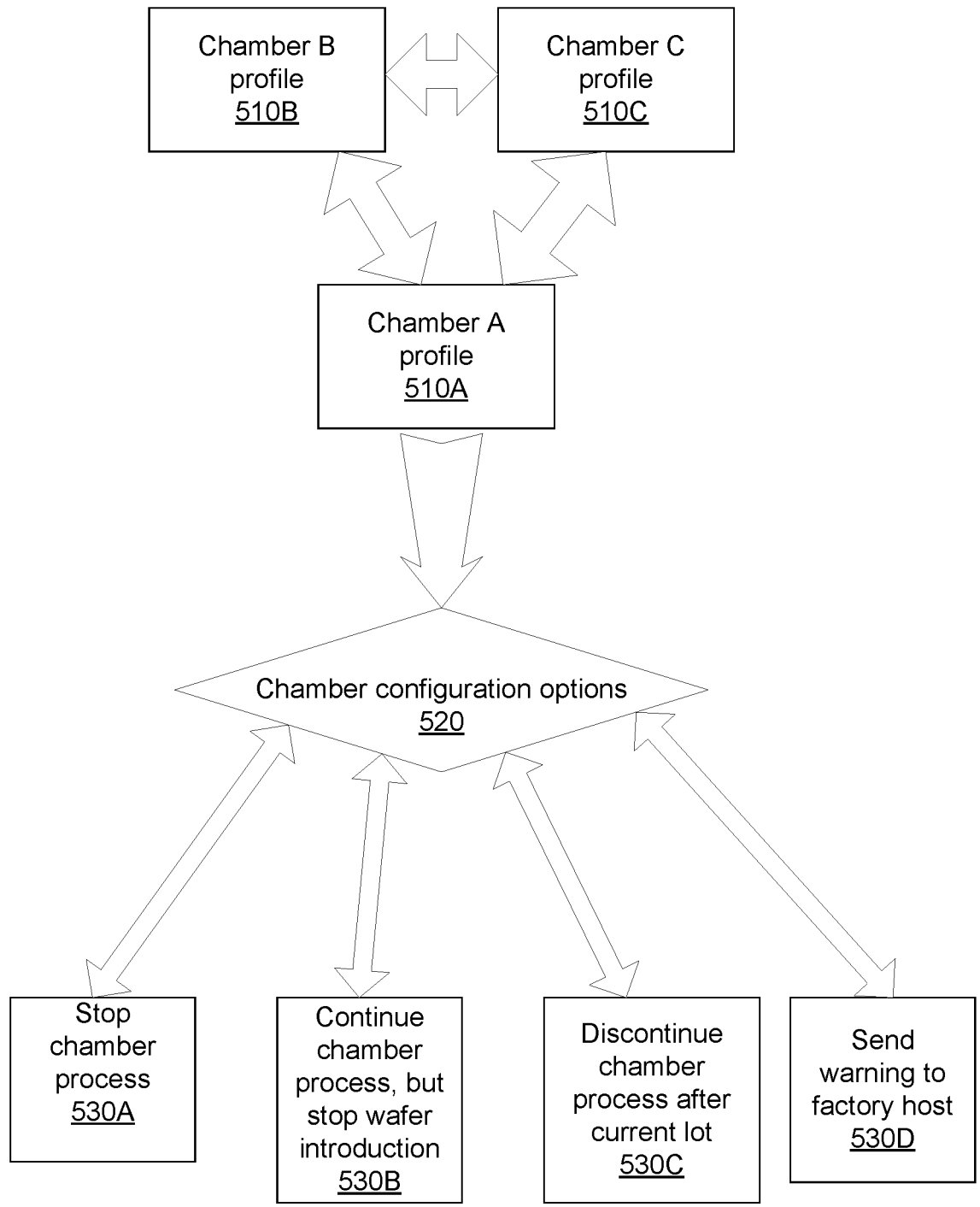
FIG. 5 is a flow diagram of an example method to using blockchain solution for taking preventive action system-wide after finding an errant condition in one chamber, in accordance with some embodiments of the present disclosure.

FIG. 5 shows how blockchain can be used for chamber profile validation, according to an embodiment of the present disclosure. In this example embodiment, chamber A has a locally saved profile 510A. Chamber A is connected to other chambers with respective profiles 510B and 510C. The chambers A, B and C all may be configured locally or via a central controller (not shown here). The chambers A, B and C are configured to communicate with each other in this example. Ideally, chambers A, B, and C should run the same process recipe, i.e. profiles 510A, 510B and 510C should be identical. If a fault is detected locally in one of the chambers, e.g., chamber A, then there are several configuration options 520 that may be applied to chamber A. The chamber process may be stopped (option 530A); the chamber process may be continued, but no more new wafers are introduced in the chamber (option 530B); the chamber process may be discontinued after finishing the current lot of wafers (option 530C); and/or an warning signal may be sent to the factory host (option 530D). These are just a few non-limiting configuration options for an individual chamber. However, since the chambers are part of a trusted blockchain network, the other chambers B and C may also react to the same configuration option as chamber A. By doing this, the extent of potential wafer loss due to a faulty chamber may be regulated.

Figure 6:
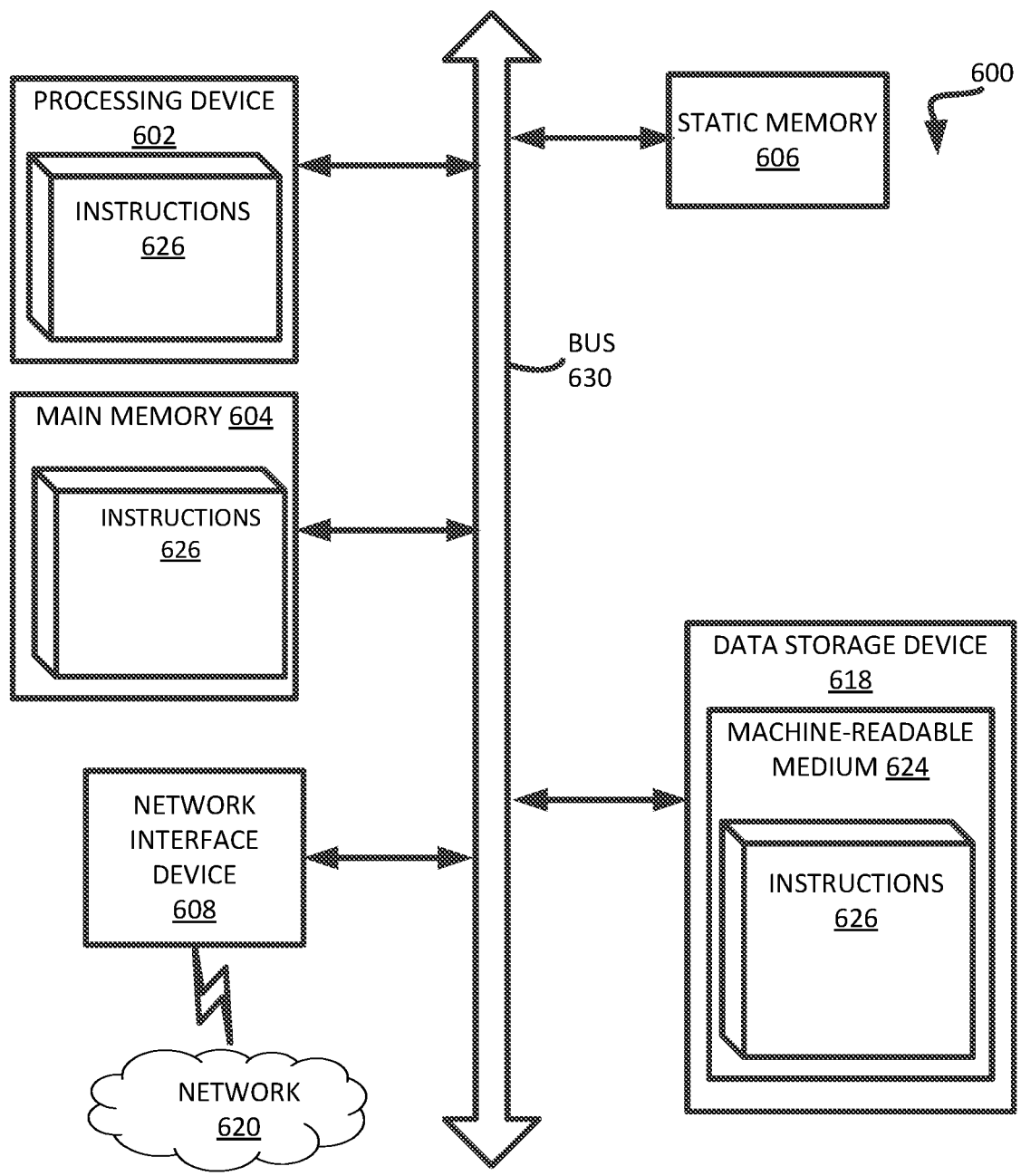
FIG. 6 is a block diagram of an example computer system in which embodiments of the present disclosure can operate.

FIG. 6 illustrates an example machine of a computer system 600 within which a set of instructions, for causing the machine to perform any one or more of the methodologies discussed herein, can be executed. In some embodiments, the computer system 600 can be used to perform the operations of a controller (e.g., to execute an operating system to perform operations corresponding to Profile ID management using blockchain). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media.

In one embodiment, the instructions 626 include instructions to implement functionality corresponding to a blockchain node. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computer-implemented method for managing changes in hardware operating profiles in a distributed network of chambers for semiconductor processing, the method comprising:
   receiving an initial list of hardware operating profiles at a first node of the distributed network of chambers for semiconductor processing;
   cryptographically assigning, by a processor, a first hash to the initial list of hardware operating profiles to create a first encrypted block with a first time stamp;
   disseminating the first encrypted block to a second node of the distributed network of chambers for semiconductor processing, the first encrypted block enabling all chambers coupled to the second node to use the initial list of hardware operating profiles;
   receiving a second list of hardware operating profiles at the first node of the distributed network of chambers for semiconductor processing;
   cryptographically assigning, by the processor, a second hash to the second list of hardware operating profiles to create a second encrypted block with a second time stamp, the second hash being created by incorporating information from the first hash, and the second time stamp indicating that the second list has at least one hardware operating profile that has been updated since the first time stamp;
   appending the second encrypted block to the first encrypted block to create a chain of blocks;
   disseminating the chain of blocks to the second node of the distributed network of chambers for semiconductor processing, the chain of blocks enabling all chambers coupled to the second node to use the at least one hardware operating profile that has been updated.

2. The method of claim 1, wherein the method further comprises:
   validating, by a processor at the second node of the distributed network of chambers for semiconductor processing, a process recipe that uses the at least one hardware operating profile that has been updated.

3. The method of claim 1, wherein the second node of the distributed network of chambers for semiconductor processing comprises a local controller of a particular chamber.

4. The method of claim 1, wherein the second node of the distributed network of chambers for semiconductor processing comprises a central controller that controls a tool system that comprises a plurality of chambers.

5. The method of claim 1, wherein the second node of the distributed network of chambers for semiconductor processing comprises a server shared by a plurality of tool systems, each tool system comprising a plurality of chambers.

6. The method of claim 5, wherein the plurality of tool systems are physically located at the same geographical location.

7. The method of claim 5, wherein the plurality of tool systems are physically located at different geographical locations.

8. The method of claim 2, wherein the method further comprises:
   in response to failure to validate the process recipe at the second node, configure at least one chamber coupled to the second node to react by choosing one of the following options: discontinuing current process immediately, discontinuing current process after a current lot of wafers are finished processing, or, continuing current process without introducing new wafers.

9. The method of claim 8, wherein the method further comprises:
   sending a warning message to all chambers coupled to the second node to enable respective chamber controllers to take preventative action.

10. The method of claim 2, wherein the hardware operating profile conceals details of actual hardware settings from an end user, but enables the end user to use the process recipe based solely on access to the hardware operating profile.

11. The method of claim 10, wherein the details of the actual hardware settings comprise information proprietary to an originating user who originates the process recipe.

12. A system for managing changes in hardware operating profiles in a distributed network of chambers for semiconductor processing, the system comprising:
   a memory; and
   a computer processor at a first node of the distributed network of chambers for semiconductor processing, the processor operatively coupled with the memory, to:
   receive an initial list of hardware operating profiles;
   cryptographically assign a first hash to the initial list of hardware operating profiles to create a first encrypted block with a first time stamp;
   disseminate the first encrypted block to a second node of the distributed network of chambers for semiconductor processing, the first encrypted block enabling all chambers coupled to the second node to use the initial list of hardware operating profiles;
   receive a second list of hardware operating profiles;
   cryptographically assign a second hash to the second list of hardware operating profiles to create a second encrypted block with a second time stamp, the second hash being created by incorporating information from the first hash, and the second time stamp indicating that the second list has at least one hardware operating profile that has been updated since the first time stamp;

append the second encrypted block to the first encrypted block to create a chain of blocks;

disseminate the chain of blocks to the second node of the distributed network of chambers for semiconductor processing, the chain of blocks enabling all chambers coupled to the second node to use the at least one hardware operating profile that has been updated.

13. The system of claim 12, wherein the system further comprises:

a second processor at the second of the distributed network of chambers for semiconductor processing, the second processor to validate a process recipe that uses the at least one hardware operating profile that has been updated.

14. The system of claim 12, wherein the second node of the distributed network of chambers for semiconductor processing comprises a local controller of a particular chamber.

15. The system of claim 12, wherein the second node of the distributed network of chambers for semiconductor processing comprises a central controller that controls a tool system that comprises a plurality of chambers.

16. The system of claim 12, wherein the second node of the distributed network of chambers for semiconductor processing comprises a server shared by a plurality of tool systems, each tool system comprising a plurality of chambers.

17. The system of claim 16, wherein the plurality of tool systems are physically located at the same geographical location.

18. The system of claim 16, wherein the plurality of tool systems are physically located at different geographical locations.

19. The system of claim 13, wherein the hardware operating profile conceals details of actual hardware settings from an end user, but enables the end user to use the process recipe based solely on access to the hardware operating profile.

20. The system of claim 19, wherein the details of the actual hardware settings comprise information proprietary to an originating user who originates the process recipe.

* * * * *